US009645852B2

(12) United States Patent
Anderson et al.

(10) Patent No.: US 9,645,852 B2
(45) Date of Patent: May 9, 2017

(54) MANAGING A WORKLOAD IN AN ENVIRONMENT

(71) Applicant: International Business Machines Corporation, Armonk, NY (US)

(72) Inventors: Jason L. Anderson, San Jose, CA (US); Gregory J. Boss, Saginaw, MI (US); Jeffrey L. Coveyduc, San Jose, CA (US); Andrew D. Hately, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/488,914

(22) Filed: Sep. 17, 2014

(65) Prior Publication Data

US 2016/0077881 A1    Mar. 17, 2016

(51) Int. Cl.
*G06F 9/46* (2006.01)
*G06F 9/50* (2006.01)
*G06F 9/48* (2006.01)

(52) U.S. Cl.
CPC .......... *G06F 9/5011* (2013.01); *G06F 9/4881* (2013.01)

(58) Field of Classification Search
CPC .............................. G06F 9/5011; G06F 9/4881
USPC .................................. 718/104, 105; 709/226
See application file for complete search history.

(56) References Cited

U.S. PATENT DOCUMENTS

| 7,107,327 | B2* | 9/2006 | Kakadia | G06F 11/3447 |
| | | | | 702/186 |
| 2001/0013025 | A1* | 8/2001 | Ananda | G06F 21/125 |
| | | | | 705/60 |
| 2008/0009344 | A1* | 1/2008 | Graham | G07F 17/32 |
| | | | | 463/25 |
| 2009/0207752 | A1* | 8/2009 | Bugenhagen | H04L 12/2697 |
| | | | | 370/252 |
| 2011/0270968 | A1 | 11/2011 | Salsburg et al. | |
| 2012/0051263 | A1* | 3/2012 | Ozawa | H04L 12/2697 |
| | | | | 370/254 |
| 2012/0137003 | A1 | 5/2012 | Ferris et al. | |
| 2012/0185868 | A1* | 7/2012 | Bartfai-Walcott | G06F 9/445 |
| | | | | 718/105 |

(Continued)

OTHER PUBLICATIONS

Mell, P., et al. "The NIST Definition of Cloud Computing", National Institute of Standards and Technology Special Publication 800-145, Sep. 2011. 7 pages.

*Primary Examiner* — H S Sough
*Assistant Examiner* — Kimberly Jordan
(74) *Attorney, Agent, or Firm* — Stosch Sabo

(57) ABSTRACT

A system and computer-implemented method for managing a workload in an environment is disclosed. The method may include establishing a shadow workload on a shadow computer environment, wherein the shadow workload is a copy of an original workload. The method may include communicating a shadow input for the shadow workload, wherein the shadow input is a copy of an original input for the original workload. The method may also include collecting an original output from the original workload and a shadow output from the shadow workload. The method may also include determining, by comparing the original output from the original workload with the shadow output from the shadow workload, whether the shadow computer environment is configured to operate the original workload.

11 Claims, 5 Drawing Sheets

(56) References Cited

U.S. PATENT DOCUMENTS

| | | | |
|---|---|---|---|
| 2014/0258747 A1* | 9/2014 | Narayan | G06F 1/3287 713/320 |
| 2015/0106522 A1* | 4/2015 | Ryan | H04L 67/1023 709/226 |

* cited by examiner

MANAGING A WORKLOAD IN AN ENVIRONMENT

BACKGROUND

The present disclosure relates to computer systems, and more specifically, to managing a workload in an environment.

A hybrid cloud model is one option for businesses to manage cyclical workloads and lighten the load on local hardware resources. As cloud services continue to grow, businesses have an increasing number of potential cloud computing environments on which to deploy their workloads. Cloud computing environments can be tested to determine whether a particular cloud is suitable for a given workload.

SUMMARY

Aspects of the present disclosure, in certain embodiments, are directed toward a system and method for managing a workload in an environment. In certain embodiments, the method may include establishing a shadow workload on a shadow computer environment, wherein the shadow workload is a copy of an original workload. In certain embodiments, the method may include communicating a shadow input for the shadow workload. The shadow input may be a copy of an original input for the original workload. In certain embodiments, the method may also include collecting an original output from the original workload and a shadow output from the shadow workload. In certain embodiments, the method may also include determining, by comparing the original output from the original workload with the shadow output from the shadow workload, whether the shadow computer environment is configured to operate the original workload.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
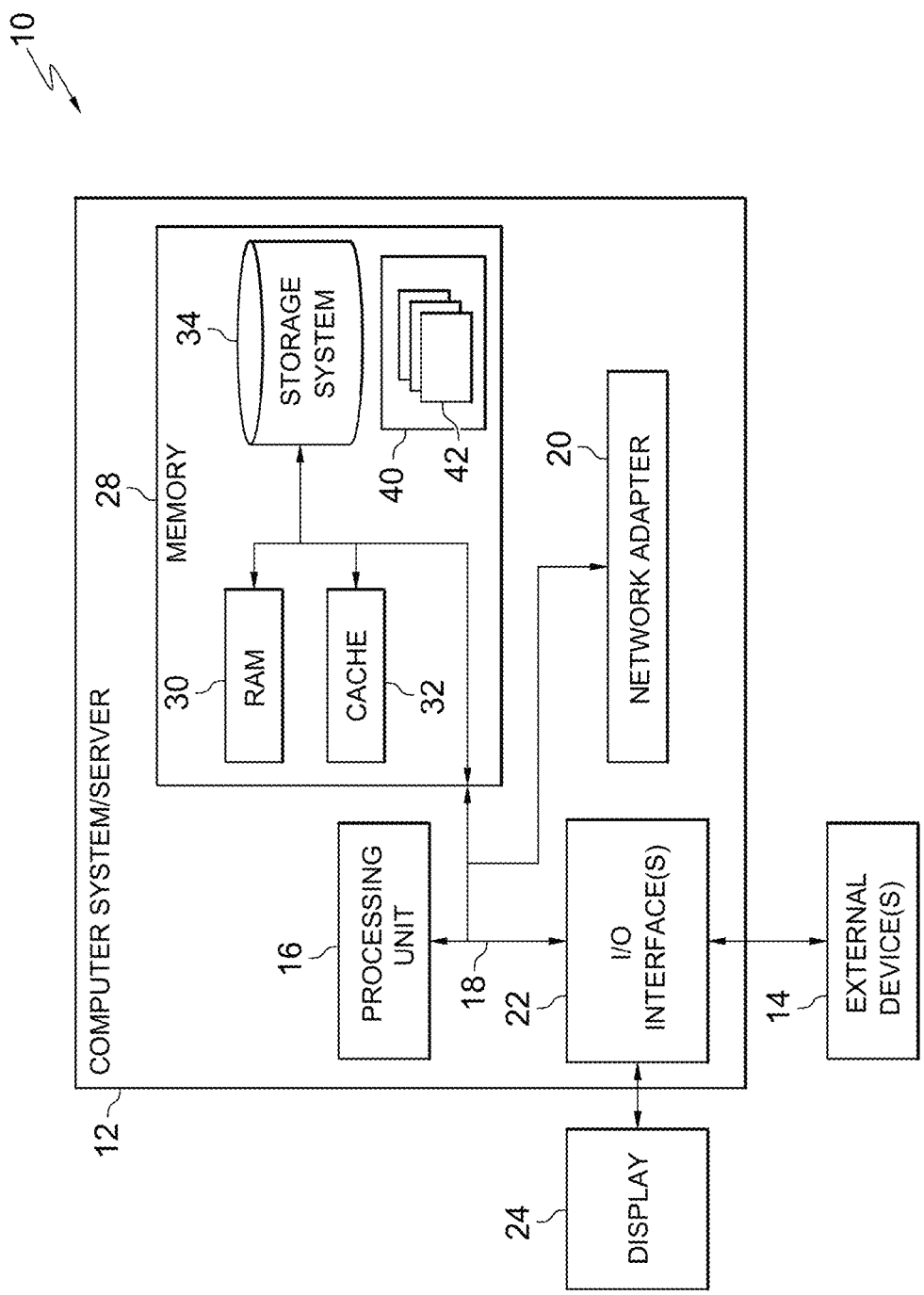
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for managing a workload in an environment. More particular aspects relate to testing a set of alternative computer environments for running a set of workloads. The set of workloads may include an original workload running on an original computer environment. The method may include establishing a shadow workload on a shadow computer environment, wherein the shadow workload is a copy of the original workload. The method may include communicating a shadow input for the shadow workload, wherein the shadow input is a copy of an original input for the original workload. The method may also include collecting an original output from the original workload and a shadow output from the shadow workload. Further, the method may include determining, by comparing the original output from the original workload with the shadow output from the shadow workload, whether the shadow computer environment is configured to operate the original workload.

A hybrid cloud model (wherein an organization manages some resources in-house and manages others externally) is one option for businesses to manage cyclical workloads and lighten the load on local hardware resources. As cloud services continue to grow, businesses have an increasing number of potential computer environments on which to deploy their workloads. Aspects of the present disclosure, in certain embodiments, relate to the recognition that there may be challenges associated with determining whether a particular cloud environment is compatible with a given workload. Cloud environments can utilize different software and hardware architectures, and complex, legacy, or undocumented workloads may have attributes which can impede the migration, duplication or horizontal scaling of a given workload to a hybrid-public cloud system. Accordingly, aspects of the present disclosure, in certain embodiments, are directed toward a system and method for determining, using a shadow workload provisioned on a public cloud, whether the public cloud is configured to operate a given workload. Aspects of the present disclosure may provide benefits associated with workload efficiency, improved compatibility, and time saving.

As an example, aspects of the present disclosure may be useful for evaluating multiple cloud environments to determine which one (or more than one) is compatible with a given cloud workload. For instance, a company that is reaching the limit of their local hardware resources may wish to find a suitable public cloud environment to host their local workload. Accordingly, aspects of the present disclosure are directed toward assessing multiple other cloud environments to determine one that is configured to operate the local workload. For example, three cloud environments could be evaluated, and one (or more) may be determined to be compatible with the local workload.

Aspects of the present disclosure relate to various embodiments of a system and method for managing a workload in an environment. More particular aspects relate to testing a set of alternative computer environments for running a set of workloads. The set of workloads may include an original workload running on an original computer environment. The original computer environment may be a private cloud and the shadow computer environment may be a public cloud. The method and system may work on a number of devices and operating systems. Aspects of the present disclosure include establishing a shadow workload on a shadow computer environment, wherein the shadow workload is a copy of the original workload. Establishing the shadow workload on the shadow computer environment may include assigning, to a set of cloud nodes of the shadow computer environment, a workload resource usage estimation. Based on the workload resource estimation, the method can include allocating a portion of system resources of the set of cloud nodes for the workload. The method can also include processing, by the set of cloud nodes, a set of original workload instructions for the portion of system resources for the workload.

Aspects of the present disclosure, in certain embodiments, are directed toward communicating a shadow input for the shadow workload, wherein the shadow input is a copy of an original input for the original workload. The method may also include collecting an original output from the original workload and a shadow output from the shadow workload. The original workload may be a multi-tiered workload having a virtual environment logical partition. In certain embodiments, a middleware architecture may run on the virtual environment logical partition, and be configured to receive the original input and transmit the original output.

Aspects of the present disclosure, in certain embodiments, are directed toward determining, by comparing the original output from the original workload with the shadow output from the shadow workload, whether the shadow computer environment is configured to operate the original workload. In certain embodiments, determining whether the shadow computer environment is configured to operate the original workload may include matching a first result feature of the original output with a second result feature of the shadow output. In certain embodiments, determining whether the shadow computer environment is configured to operate the original workload further comprises performing one or more integrity tests on the shadow computer environment. The integrity tests may include scalability, load balancing, resource usage, latency, and port isolation tests. The integrity tests may be performed in response to detecting that a network activity value has decreased below a network activity threshold.

It is understood in advance that although this disclosure includes a detailed description on cloud computing, implementation of the teachings recited herein are not limited to a cloud computing environment. Rather, embodiments of the present invention are capable of being implemented in conjunction with any other type of general purpose or specialized computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics May Include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models May Include:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are May Include:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
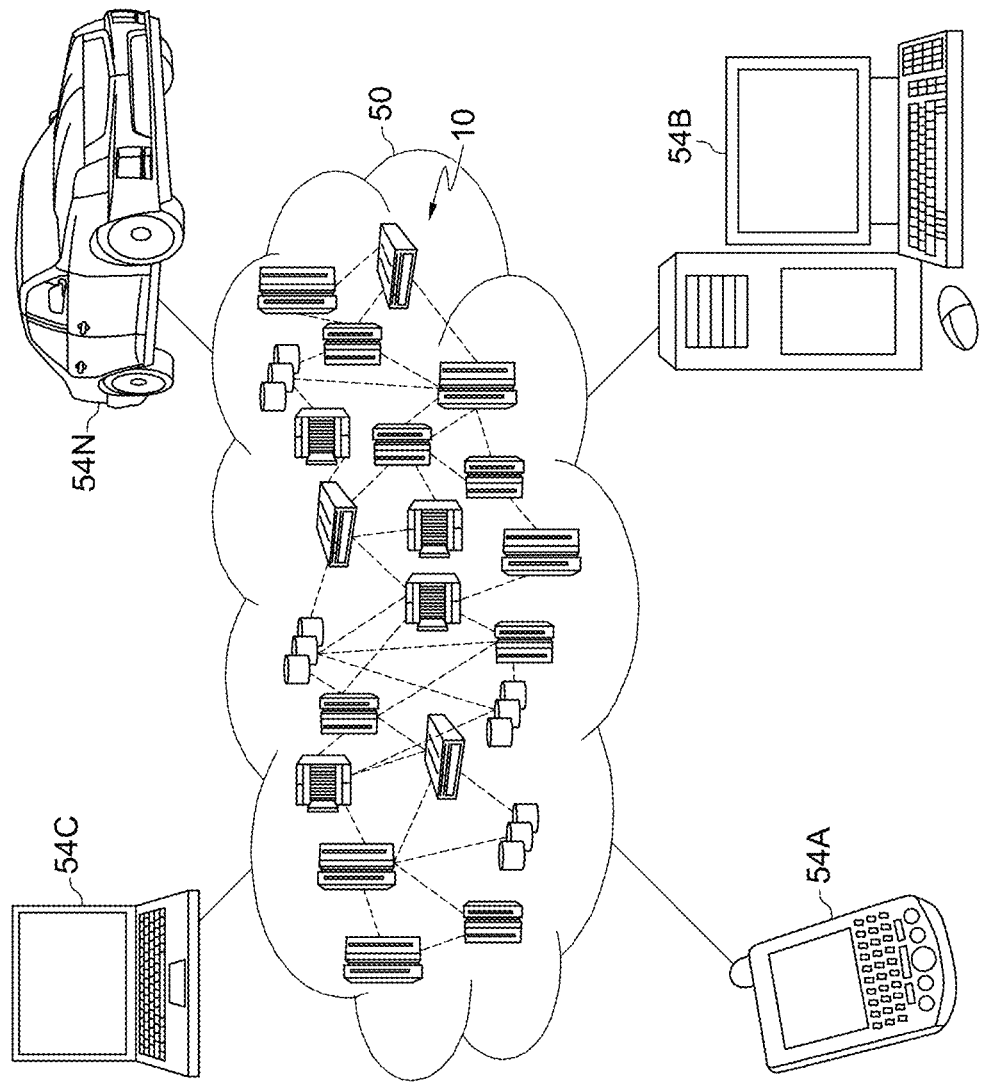
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
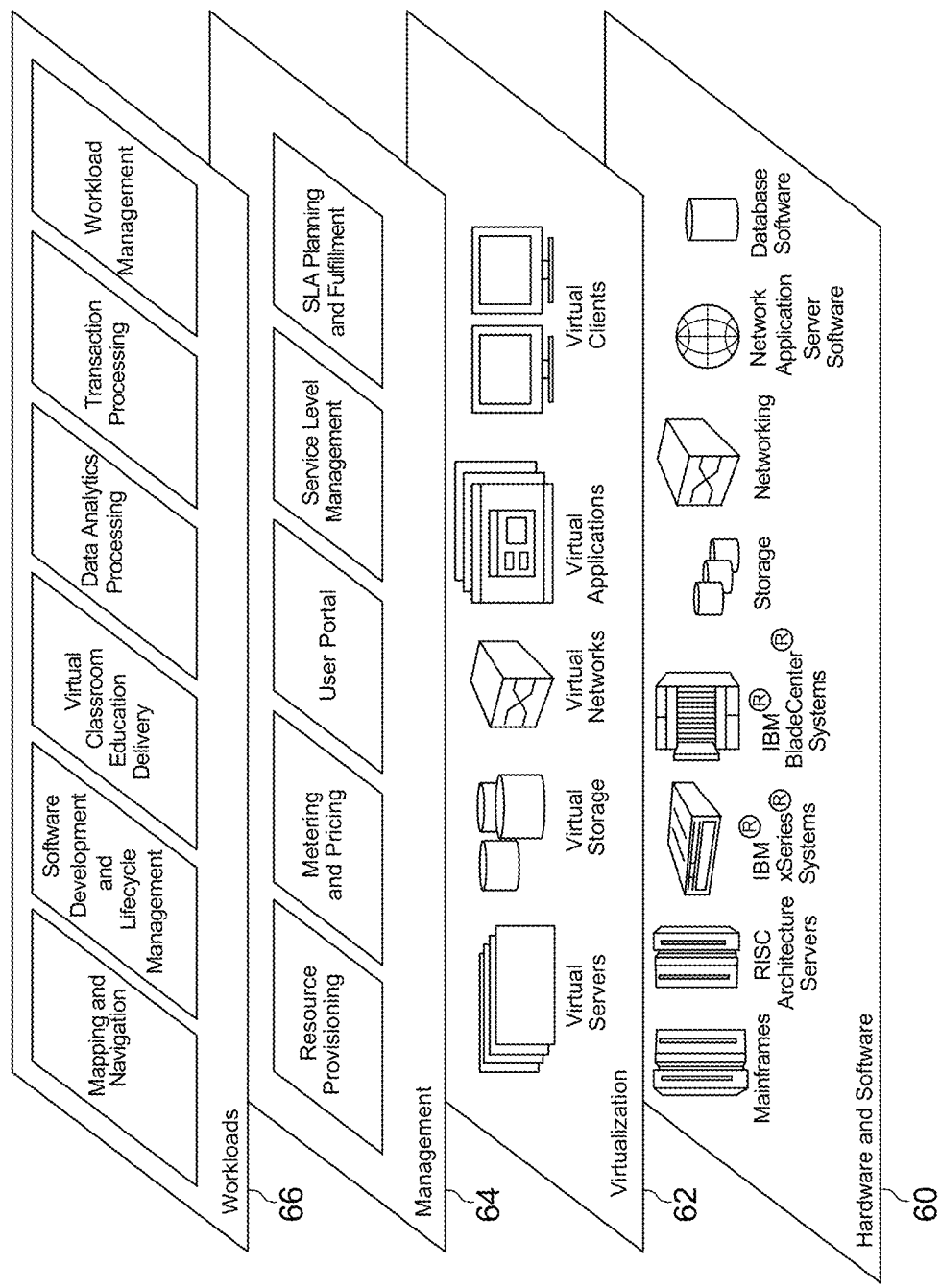
FIG. 3 depicts abstraction model layers according to embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload management. Aspects of the present disclosure may provide benefits associated with workload efficiency, improved compatibility, and time saving.

Figure 4:
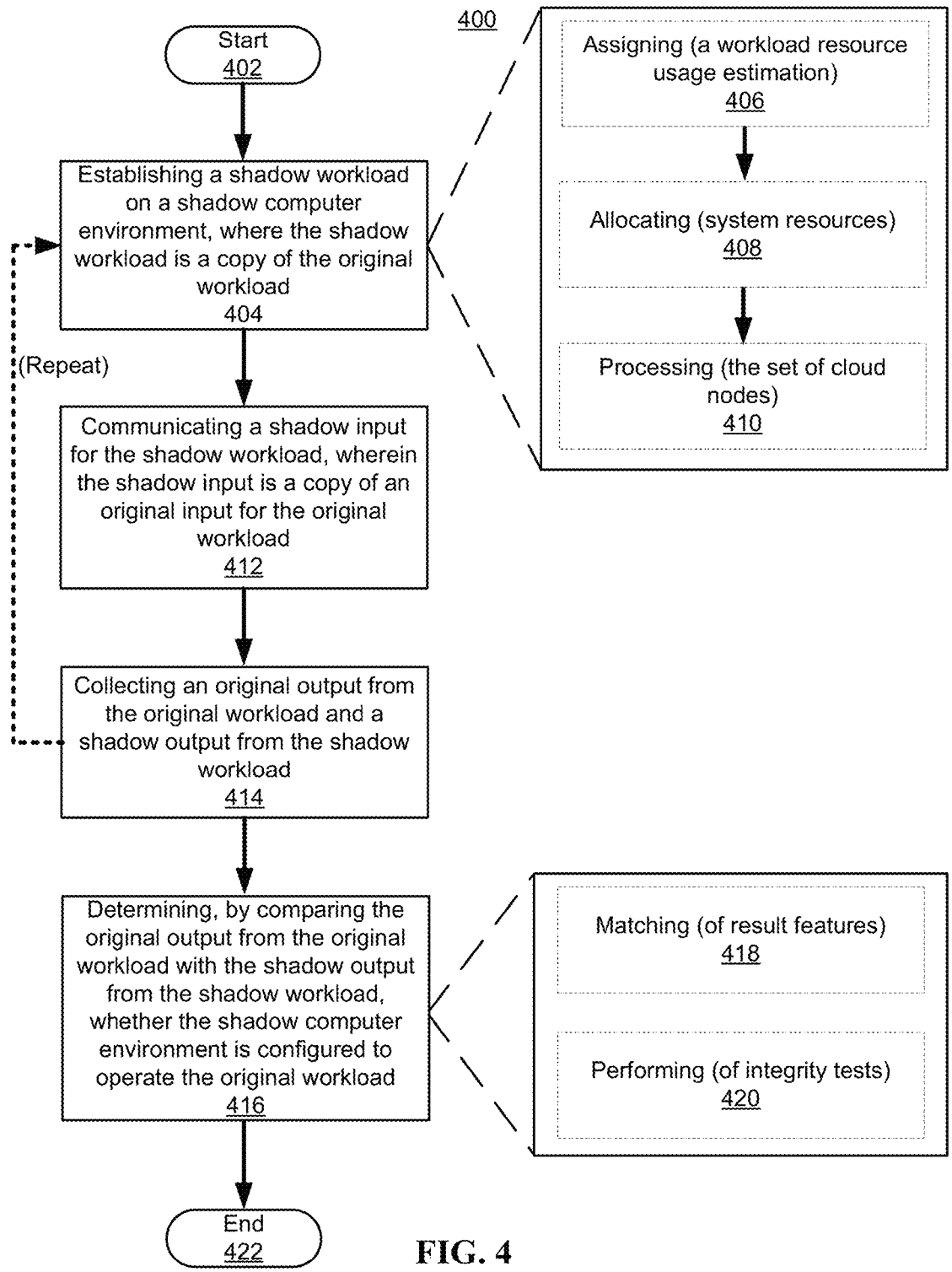
FIG. 4 is a flowchart illustrating a method for testing a set of alternative computer environments for running a set of workloads, according to embodiments.

FIG. 4 is a flowchart illustrating a method 400 for testing a set of alternative computer environments for running a set of workloads, consistent with embodiments of the present disclosure. Aspects of FIG. 4 are directed toward determining whether a shadow computer environment is configured to operate an original set of workloads including an original workload of an original computer environment. The method 400 may begin at block 402 and end at block 422. Consistent with various embodiments, the method 400 can include an establishing block 404, an assigning block 406, an allocating block 408, a processing block 410, a communicating block 412, a collecting block 414, a determining block 416, a matching block 418, and a performing block 420.

Consistent with various embodiments, at block 404 the method 400 may include establishing a shadow workload on a shadow computer environment, where the shadow workload is a copy of the original workload. The shadow computer environment and the original computer environment may be two distinct computer environments. In general, the shadow computer environment and the original computer environment may include various hardware, software, databases, and other components comprising a single computer system or multiple networked computer systems. Both the shadow computer environment and the original computer environment may be separate cloud-computing environments including multiple computer systems (e.g., nodes) sharing information and resources over a distributed network. In certain embodiments, the shadow computer workload and the original computer workload may be made up of different hardware and software architectures, utilize different operating systems, and be of substantially different scales (e.g., one may have significantly more resources or nodes than the other). In general, the shadow workload and the original workload may be a set of tasks, instructions, requests, or components that place demands on a system (e.g., the computer environment on which they are running). For example, the workload may be a database program that places demands on the CPU (central processing unit), memory, GPU (graphics processing unit), storage medium, or other system resources. As described herein, in certain embodiments the shadow workload may be a copy of the original workload. For instance, the shadow workload may be the same database program, and may have the same requirements in terms of computer system resources.

In certain embodiments, the shadow workload may have a similar deployment environment to the original workload. For instance, the shadow workload may have access to the same virtual machine images as the original workload, and be capable of deploying them. Further, the shadow workload may support other workload packaging formats that are also supported by the original workload.

Consistent with various embodiments, at block 406 establishing the shadow workload may include assigning, to a set of cloud nodes of the shadow computer environment, a workload resource usage estimation. The workload resource usage estimation may be based on past resource usage statistics for the original workload, and provide the shadow workload with a projected resource usage approximation for the shadow workload. For example, the workload resource usage estimation may specify memory usage, CPU and GPU loads, network traffic activity levels, power consumption, and other information that may allow the shadow computer environment to approximate the resource usage requirements of the original workload. Based on the workload resource estimation, at block 408 the shadow computer environment may be configured to allocate a portion of system resources of the set of cloud nodes for the workload. For example, the shadow computer environment may designate a subset of the set of cloud nodes having sufficient resources to operate the original workload. In certain embodiments, a single node may be allocated for the shadow workload. In certain embodiments, multiple nodes may share the shadow workload.

In response to allocating a portion of the set of system resources of the set of cloud nodes, at block 410 the shadow computer environment may include processing a set of original workload instructions for the portion of system resources for the shadow workload. In certain embodiments, the set of original workload instructions may be processed by the set of cloud nodes. The set of original workload instructions may be based on usage statistics of the original workload running on the original computer environment, and specify how the allocated system resources of the set of nodes may be used to operate the shadow workload on the shadow computer environment. Accordingly, processing the set of original workload instructions may include configuring the set of cloud nodes to use the allocated system resources to operate the shadow workload.

Consistent with various embodiments, at block 412 the method 400 may include communicating a shadow input for the shadow workload. The shadow input may be a copy of an original input for the original workload. In certain embodiments, the original input may be a message, user command, authentication request, network traffic, data packet, or other form of input bound for the original workload. Accordingly, the original input may be copied prior to arriving at the original workload, and delivered to the shadow workload running on the shadow computer environment. In certain embodiments, the original input and the shadow input may be delivered to the original workload and the shadow workload, respectively, at substantially the same time. As described herein, the shadow input may be a copy of the original input. Put differently, the shadow input may be an identical reproduction of the original input. As an example, the original input may be a password verification request submitted to the first workload by a user attempting to access a database. Accordingly, the shadow input may be a copy of the password verification request.

Consistent with various embodiments, at block 414 the method 400 can include collecting an original output from the original workload and a shadow output from the shadow workload. Collecting the original output and the shadow output may include using a comparison module configured to receive the original output from the original workload and the shadow output from the shadow workload. In certain embodiments, the original output and the shadow output may be a response to the original input and the shadow input, respectively. For example, the original workload may process the original input and produce the original output, and the shadow workload may process the shadow input and produce the shadow output. As an example, for a situation where the original input and the shadow input are password verification requests, the original output and the shadow output may be responses granting or denying the password verification request. In certain embodiments, at block 414 the method 400 may include collecting copies of the original output, the shadow output, or both. In this way, the outbound performance of both the original workload and the shadow workload can remain substantially unchanged.

Consistent with various embodiments, at block 416 the method 400 can include determining, by comparing the original output from the original workload with the shadow output from the shadow workload, whether the shadow computer environment is configured to operate the original workload. Operating the original workload may include facilitating the tasks and operations of the original workload in the shadow computer environment. In certain embodiments, comparing the original output and the shadow output may be performed by a comparison module. At block 418, the comparison module may be configured to match a first result feature of the original output with a second result feature of the shadow output. The first result feature and the second result feature may, for example, include a characteristic of the output that indicates the outcome of the processing performed on the input by the workload. In certain embodiments, the comparison module may be configured to perform deep packet inspection (e.g., 1-to-1 packet matching) to identify the first result feature and the second result feature.

Consider once again the example scenario in which the original input and the shadow input are password verification requests. In certain embodiments, the original workload may have access to a database of usernames and passwords, and be configured to reference the database to verify the username and password of the password verification request. Accordingly, the original workload may process the original input, authenticate the username and password, and produce an original output granting or denying access to the requested database. In certain embodiments, the shadow workload may not have access to the database of usernames and passwords, and thusly be unable to authenticate the password verification request. Accordingly, the shadow workload may produce an error event or error message. The comparison module may compare the original output and the shadow output, and identify that the first result feature of the original input (e.g., permission to access the requested database) does not match the second result feature (e.g., the error event or error message) of the shadow output.

In certain embodiments, by comparing the original output with the shadow output, the method 400 may be configured to determine whether the shadow computer environment is configured to operate the original workload. As an example, if the comparison module determines that the first result feature of the original workload matches the second result feature of the shadow workload, the method 400 may determine that the shadow computer environment is configured to operate the original workload. If the comparison module determines that the first result feature of the original workload does not match the second result feature of the shadow workload, the method 400 may determine that the shadow computer environment is not configured to operate the original workload.

In certain embodiments, at block 420 the method 400 may include performing one or more integrity tests on the shadow computer environment to determine if the shadow computer environment is configured to operate the original workload. In certain embodiments, the integrity tests may be performed in addition to comparing the shadow output with the original output using the comparison module. The integrity tests can be one or more selected from a group including scalability, load balancing (monolithic application), resource usage (horizontal application), latency, and port isolation (VLAN isolation). The integrity tests can be configured to verify whether the shadow environment has sufficient system resources, bandwidth, and compatible architecture to support the original workload. In certain embodiments, the integrity tests can be performed in response to detecting that a network activity value has decreased below a network activity threshold. The network activity value and the network activity threshold may, for instance, be data per time values. For example, the network activity threshold may be 50 megabits per second, and the network activity value may be 43 megabits per second. Such a configuration may provide benefits associated with decreased latency and available network bandwidth.

Figure 5:
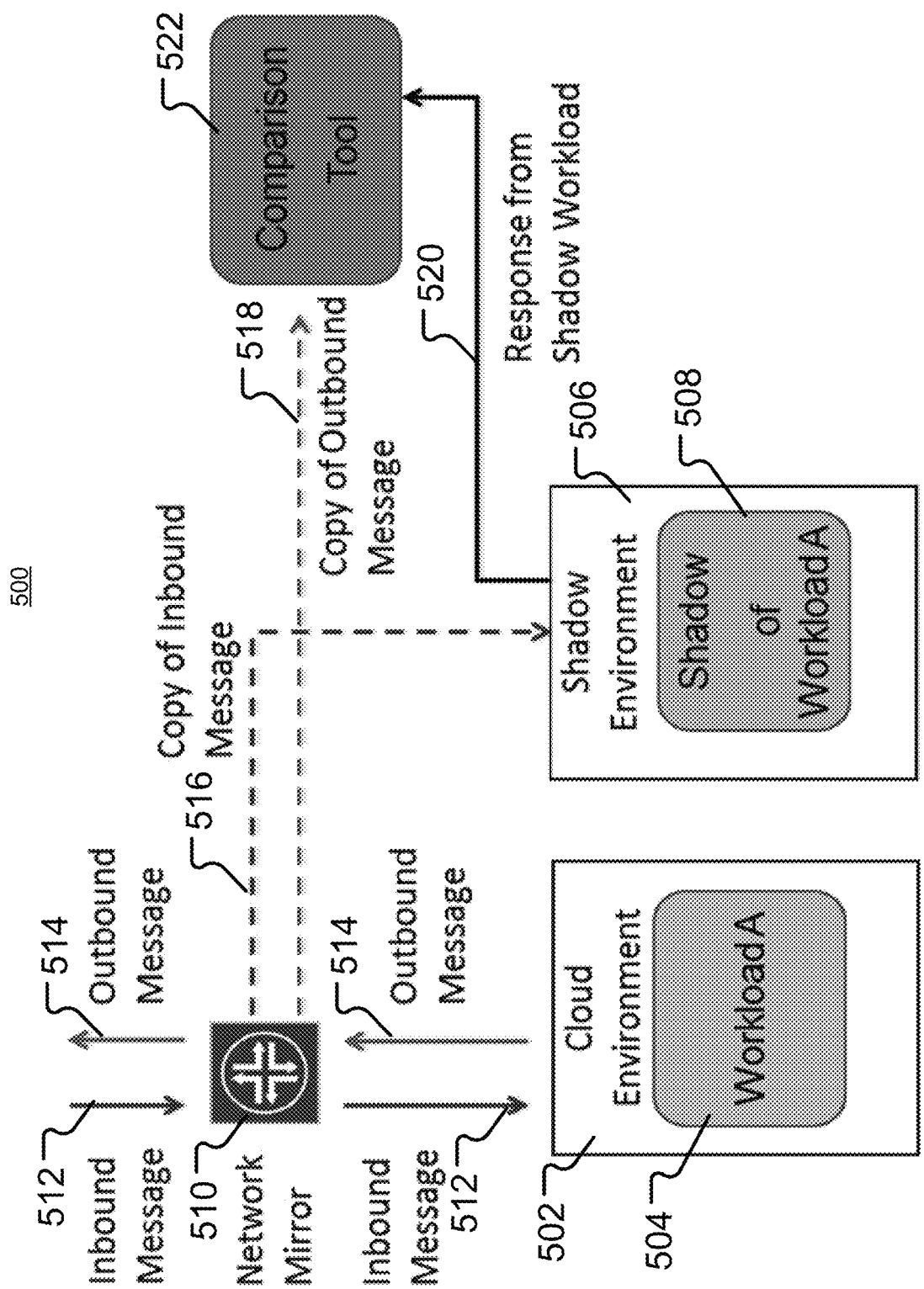
FIG. 5 is a diagram illustrating an example system architecture for testing a set of alternative computer environments for running a set of workloads, according to embodiments.

FIG. 5 is a diagram illustrating an example system architecture 500 for testing a set of alternative computer environments for running a set of workloads, consistent with embodiments of the present disclosure. Aspects of FIG. 5 are directed toward comparing the output of an original workload with the output of a shadow workload to determine whether the shadow computer environment is configured to operate an original workload of the original computer environment. The system architecture 500 may include a cloud environment 502 (e.g., an original computer environment) with a workload A 504 (e.g., an original workload), a shadow environment 506 (e.g., a shadow computer environment) with a shadow of workload A 508 (e.g., a shadow workload), a network mirror 510, an inbound message 512 (e.g., an original input), an outbound message 514 (e.g., an original output), a copy of the inbound message 516, a copy of the outbound message 518, a response from the shadow workload 520 (e.g., a shadow output), and a comparison tool 522 (e.g., a comparison module).

Consistent with various embodiments, the cloud environment 502 may be a private cloud, and the shadow environment 506 may be a public cloud. The cloud environment 502 may host a workload A 504 including a set of tasks, instructions, requests, or components that place demands on the cloud environment 502. In certain embodiments, the original workload may be a multi-tiered workload having a virtual environment logical partition. The shadow environment 506 may be a heterogeneous computer environment utilizing software and hardware architecture different from that of the cloud environment 502. Consistent with various embodiments of the present disclosure, the shadow of workload A 508 may be a copy of workload A 504; that is, it includes a similar set of tasks, instructions, requests, and components as workload A 504.

In certain embodiments, workload A 504 and the shadow of workload A 508 may include middleware infrastructure running within the virtual environment logical partition of each workload. The middleware infrastructure may be configured to transmit and receive messages, data, and other network traffic. For example, the middleware infrastructure may be configured to receive an inbound message 512, process the inbound message 512 using one or more components of the workload 504, and transmit an outbound message 514. In certain embodiments, the inbound message 512 may be a user command, authentication request, network traffic, data packet, or other form of input bound for workload A 504.

As shown in FIG. 5, in certain embodiments the system architecture 500 may include a network mirror 510. The network mirror 510 may be a network switch configured to send a copy of network packets seen on one switch port (or an entire virtual local area network) to another network connection on another switch port (e.g., port mirroring). Aspects of the present disclosure, in certain embodiments, are directed toward using the network mirror 510 to copy (e.g., mirror, or "fork") the inbound message 512 and the outbound message 514. As shown in FIG. 5, the network mirror 510 may be configured to transmit a copy of the inbound message 516 to the shadow of workload A 508 on the shadow environment 506. Accordingly, the shadow of workload A 508 may be configured to process the copy of the inbound message 516, and generate a response from the shadow workload 520. The comparison tool 522 may then be configured to collect both the copy of the outbound message 518 and the response from the shadow workload 520.

In certain embodiments the comparison tool 522 may be configured to compare the copy of the outbound message 518 with the response from the shadow workload 520. In certain embodiments, the comparison tool 522 may perform deep packet inspection to determine whether or not the copy of the outbound message 518 substantially corresponds to the response from the shadow workload 520. The comparison tool 522 may have a correspondence threshold to quantify the similarity between the copy of the outbound message 518 and the response from the shadow workload 520. As an example, the correspondence threshold may be a percentage indicating a tolerance ratio of data packets of the response from the shadow workload 520 that match the data packets of the copy of the outbound message 518. For instance, the correspondence threshold may be 95%. In response to comparing the response from the shadow workload 520 with the copy of the outbound message 518, the comparison tool 522 may compute a correspondence value to express the ratio of data packets of the response from the shadow workload 520 that match the data packets of the copy of the outbound message 518. For instance, in certain embodiments the correspondence value may be computed to be 97%. Accordingly, as described herein, in response to identifying that the copy of the outbound message 518 substantially corresponds with the response from the shadow workload 520, the comparison tool 522 may determine that the shadow environment is compatible (e.g., configured to operate) workload A 504. In certain embodiments, in response to identifying that the copy of the outbound message 518 does not substantially correspond with the response from the shadow workload 520, the comparison tool 522 may determine that the shadow environment is not compatible (e.g., not configured to operate) workload A 504.

Consider the following example. A bank may experience significant growth in its customer base, and use an on-site private cloud to manage customer data. The private cloud may approach peak capacity (e.g., bandwidth, storage, system resources) and necessitate the use of another cloud environment to facilitate the growth in the customer base and manage a client workload. A variety of public cloud services may be available to the bank, however, as each cloud service utilizes different underlying architectures, frameworks, and has varying resources and other constraints, it may be desirable for the bank to verify which cloud services will be compatible with the client workload. Accordingly, as described herein, the bank may utilize a system (e.g., system architecture 500 of FIG. 5) to test each public cloud environment and identify which would be suitable to host the client workload. For example, the system may establish a shadow workload (e.g., a copy of the client workload) on three different public cloud environments (e.g., cloud A, cloud B, and cloud C). A network mirror or other port mirroring technique can be used to copy all network traffic traveling to and from the private cloud, and send a copy of all inbound network traffic to each of the three public clouds. The system may also collect outbound messages from each shadow workload, and compare them to a copy of the outbound message from the client workload to determine which public clouds are compatible with the client workload. For example, the system may compare the outbound messages and determine that the outbound message from two of the public clouds (e.g., cloud B and cloud C) contains an error, while one (e.g., cloud A) is a match with the outbound message from the client workload of the private cloud. Accordingly, the system may determine that this public cloud (e.g., cloud A) is suitable to host the client workload.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for testing a set of alternative environments for running a set of workloads including an original workload of an original computer environment, the method comprising:
 establishing a shadow workload on a shadow computer environment, wherein the shadow workload includes a copy of the original workload, wherein the original workload comprises a database program, wherein establishing the shadow workload further comprises:
  assigning, to a set of cloud nodes of the shadow computer environment, a workload resource usage estimation comprising an estimated memory usage, a central processing unit (CPU) load, a graphics processing unit (GPU) load, a network traffic activity level, and a power consumption, wherein the workload resource usage estimation is based on resource usage statistics for the original workload;
  allocating, based on the workload resource usage estimation, a portion of system resources of the set of cloud nodes for the shadow workload; and
  processing, by the set of cloud nodes, a set of original workload instructions for the portion of system resources for the shadow workload;
 communicating, for the shadow workload, a shadow input that includes a copy of an original input for the original workload, wherein the original input comprises a password verification request submitted to the original workload by a user attempting to access the database;
 collecting an original output from the original workload and a shadow output from the shadow workload; and
 determining, by comparing the original output from the original workload with the shadow output from the shadow workload, whether the shadow computer environment is configured to operate the original workload, wherein determining whether the shadow computer environment is configured to operate the original workload further comprises:
  performing one or more integrity tests on the shadow computer environment, the integrity tests comprising a port isolation test, wherein the integrity tests are performed in response to detecting that a network activity value has decreased below a network activity threshold, wherein the network activity threshold comprises a data per time value, wherein the data per time value comprises 50 megabits per second;
  calculating a percentage difference between the original output and the shadow output by comparing respective data packets of the original output with respective data packets of the shadow output;
  comparing the percentage difference to a correspondence threshold;
  in response to the percentage difference being at least the correspondence threshold, determining the shadow computer environment is configured to operate the original workload; and
  in response to the percentage difference being less than the correspondence threshold, determining the shadow computer environment is not configured to operate the original workload.

2. The method of claim 1, further comprising:
 establishing another shadow workload on another shadow computer environment, wherein the another shadow workload includes the copy of the original workload;
 communicating another shadow input for the another shadow workload, wherein the another shadow input includes the copy of the original input for the original workload;
 collecting the original output from the original workload and another shadow output from the another shadow workload, wherein the original output comprises a granting of the password verification request, wherein the another shadow output comprises an error event; and
 determining, by identifying a difference between the original output and the another shadow output, that the shadow computer environment is not configured to operate the original workload.

3. The method of claim 1, wherein the original workload is a multi-tiered workload having a virtual environment logical partition.

4. The method of claim 3, wherein a middleware architecture is running on the virtual environment logical partition, the middleware architecture configured to receive the original input and transmit the original output.

5. The method of claim 1, wherein determining whether the shadow computer environment is configured to operate the original workload further comprises matching a first result feature of the original output with a second result feature of the shadow output.

6. The method of claim 1, wherein the correspondence threshold comprises 95%.

7. A system for testing a set of alternative environments for running a set of workloads including an original workload of an original computer environment, the system comprising a memory and a processor configured to:
 establish a shadow workload on a shadow computer environment, wherein the shadow workload includes a copy of the original workload wherein the original workload comprises a database program, wherein to establish the shadow workload the processor is further configured to:
  assign, to a set of cloud nodes of the shadow computer environment, a workload resource usage estimation comprising an estimated memory usage, a central processing unit (CPU) load, a graphics processing unit (GPU) load, a network traffic activity level, and a power consumption, wherein the workload resource usage estimation is based on resource usage statistics for the original workload;
  allocate, based on the workload resource usage estimation, a portion of system resources of the set of cloud nodes for the shadow workload; and
  process, by the set of cloud nodes, a set of original workload instructions for the portion of system resources for the shadow workload;
 communicate a shadow input for the shadow workload, wherein the shadow input includes a copy of an original input for the original workload, wherein the original input comprises a password verification request submitted to the original workload by a user attempting to access the database;
 collect an original output from the original workload and a shadow output from the shadow workload; and
 determine, by comparing the original output from the original workload with the shadow output from the shadow workload, whether the shadow computer environment is configured to operate the original workload, wherein the processor configured to determine whether the shadow computer environment is configured to operate the original workload is further configured to:

perform one or more integrity tests on the shadow computer environment, the integrity tests comprising a port isolation test, wherein the integrity tests are performed in response to detecting that a network activity value has decreased below a network activity threshold, wherein the network activity threshold comprises a data per time value, wherein the data per time value comprises 50 megabits per second;

calculate a percentage difference between the original output and the shadow output by comparing respective data packets of the original output with respective data packets of the shadow output;

compare the percentage difference to a correspondence threshold;

in response to the percentage difference being at least the correspondence threshold, determine the shadow computer environment is configured to operate the original workload; and in response to the percentage difference being less than the correspondence threshold, determine the shadow computer environment is not configured to operate the original workload.

8. The system of claim 7, wherein the original workload is a multi-tiered workload having a virtual environment logical partition configured to operate a middleware infrastructure for receiving the original input and transmitting the original output.

9. The system of claim 7, wherein the processor is further configured to:

establish a second shadow workload on a second shadow computer environment and a third shadow workload on a third shadow computer environment, wherein the second shadow workload and the third shadow workload are copies of the original workload;

communicate a second shadow input for the second shadow workload and a third shadow input for the third shadow workload, wherein the second shadow input and the third shadow input include the copy of the original input for the original workload;

collect an original output from the original workload comprising a granting of the password verification request, a second shadow output from the second shadow workload comprising a granting of the password verification request, and a third shadow output from the third shadow workload comprising an error event; and determine that the second shadow computer environment is configured to operate the original workload based on the original output matching the second shadow output and the original output not matching the third shadow output.

10. A computer program product comprising a computer readable storage medium having a computer readable program stored therein, wherein the computer readable program, when executed on a first computing device, causes the first computing device to:

establish a shadow workload on a shadow computer environment, wherein the shadow workload includes a copy of an original workload, wherein the original workload comprises a database program, wherein to establish the shadow workload the computing device is further configured to:

assign, to a set of cloud nodes of the shadow computer environment, a workload resource usage estimation comprising an estimated memory usage, a central processing unit (CPU) load, a graphics processing unit (GPU) load, a network traffic activity level, and a power consumption, wherein the workload resource usage estimation is based on resource usage statistics for the original workload;

allocate, based on the workload resource usage estimation, a portion of system resources of the set of cloud nodes for the shadow workload; and process, by the set of cloud nodes, a set of original workload instructions for the portion of system resources for the shadow workload;

communicate a shadow input for the shadow workload, wherein the shadow input includes a copy of an original input for the original workload, wherein the original input comprises a password verification request submitted to the original workload by a user attempting to access the database;

collect an original output from the original workload and a shadow output from the shadow workload; and determine, by comparing the original output from the original workload with the shadow output from the shadow workload, whether the shadow computer environment is configured to operate the original workload, wherein to determine whether the shadow computer environment is configured to operate the original workload, the computing device is further configured to:

perform one or more integrity tests on the shadow computer environment, the integrity tests comprising a port isolation test, wherein the integrity tests are performed in response to detecting that a network activity value has decreased below a network activity threshold, wherein the network activity threshold comprises a data per time value, wherein the data per time value comprises 50 megabits per second;

calculate a percentage difference between the original output and the shadow output by comparing respective data packets of the original output with respective data packets of the shadow output;

compare the percentage difference to a correspondence threshold;

in response to the percentage difference being at least the correspondence threshold, determine the shadow computer environment is configured to operate the original workload; and in response to the percentage difference being less than the correspondence threshold, determine the shadow computer environment is not configured to operate the original workload.

11. The computer program product of claim 10, wherein the original workload is a multi-tiered workload having a virtual environment logical partition configured to operate a middleware infrastructure for receiving the original input and transmitting the original output.

* * * * *